United States Patent Office 3,635,954
Patented Jan. 18, 1972

1

3,635,954
3-HYDROXY-Δ⁵-PREGNANE DERIVATIVES SUBSTITUTED AT C-7 WITH KETO, LOWER ALKANOYLOXY OR HYDROXY
Richard Wightman Kierstead and Ronald Andrew Lemahieu, North Caldwell, N.J., assignors to Hoffmann-La Roche Inc., Nutley, N.J.
No Drawing. Filed Nov. 17, 1969, Ser. No. 877,482
Int. Cl. C07c 173/00
U.S. Cl. 260—239.55           41 Claims

ABSTRACT OF THE DISCLOSURE 3-hydroxy-Δ⁵ pregnane derivatives substituted at C-6 with chloro or lower alkyl and substituted at C-7 with keto, lower alkanoyloxy or hydroxy and 3,5-dihydroxy-Δ⁶ pregnane derivatives substituted at C-6 with lower alkyl which are useful as progestational agents.

SUMMARY OF THE INVENTION

In accordance with this invention, it has been found that pregnanes selected from the group consisting of compounds of the formula:

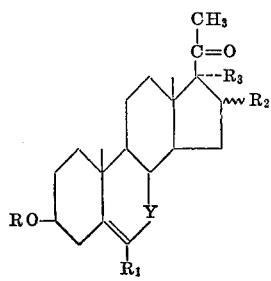

and compounds of the formula:

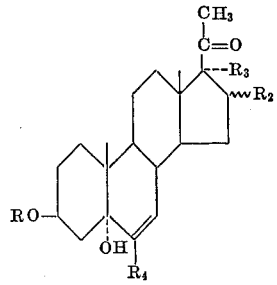

wherein R is hydrogen and lower alkanoyl; $R_1$ is chlorine or lower alkyl; Y is

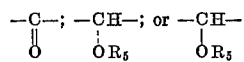

$R_2$ is hydrogen, hydroxy, lower alkylidene, and lower alkyl; $R_3$ is hydroxy, lower alkanoyloxy or taken together with $R_2$ form a moiety of the formula:

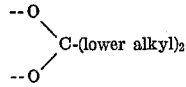

$R_4$ is lower alkyl; and $R_5$ is hydrogen or lower alkanoyl; are useful as progestational agents.

DETAILED DESCRIPTION OF THE INVENTION

As used herein, the term "halogen" comprehends all four halogens such as chlorine, fluorine, bromine and iodine. The term "lower alkyl" comprehends straight chain saturated hydrocarbon moieties having from one to six carbon atoms, such as methyl, ethyl, n-pentyl or the like. The term "halo lower alkyl" includes monosubstituted halo lower alkyl moieties where the halo is substituted at the α-carbon atom such as chloromethyl, 1-chloroethyl, 1-bromopropyl, etc., with chloromethyl being most preferred. The term "lower alkylidene" indicates a straight or branched chain hydrocarbon moiety having from one to six carbon atoms, the terminal carbon atom of which has two free valence bonds such as methylene, ethylidene, isopropylidene and the like with methylene being preferred. The term "lower alkanoyl" comprehends residues of lower alkane carboxylic acids such as acetyl, butyryl, caproyl or the like, containing from one to six carbon atoms. Alkali metal has its usual meaning and includes such metals as sodium, lithium and potassium.

In accordance with one embodiment of this invention, compounds of Formula I above where $R_1$ is chlorine, Y is

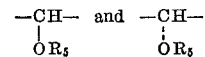

$R_5$ is lower alkanoyl, and $R_2$ is hydrogen, lower alkyl, hydroxy or taken together with $R_3$ form a

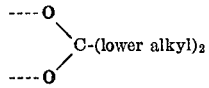

have the formula:

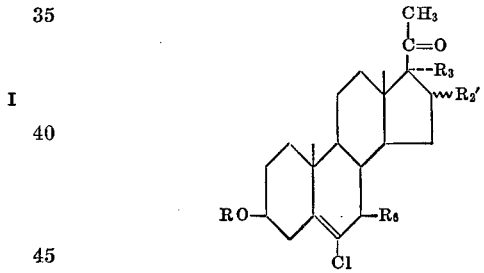

wherein R is as above; $R_6$ is $---OR_5$ or $—OR_5$; $R_3$ and $R_5$ are as above; and $R_2'$ is lower alkyl, hydrogen, hydroxy or taken together with $R_3$ form a

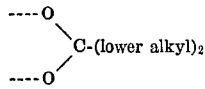

In the preferred embodiment of the compound of Formula I-A, $R_3$ is lower alkanoyloxy, preferably, acetyloxy. When R and $R_5$ are lower alkanoyl, the preferred lower alkanoyl group is acetyl.

The compound of Formula I-A is prepared from a compound of the formula:

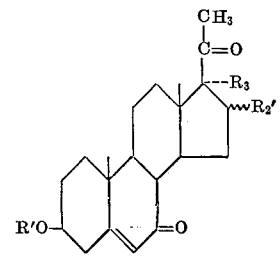

wherein R' is lower alkanoyl, and R'₂ and R₃ are as above; by the following reaction scheme:

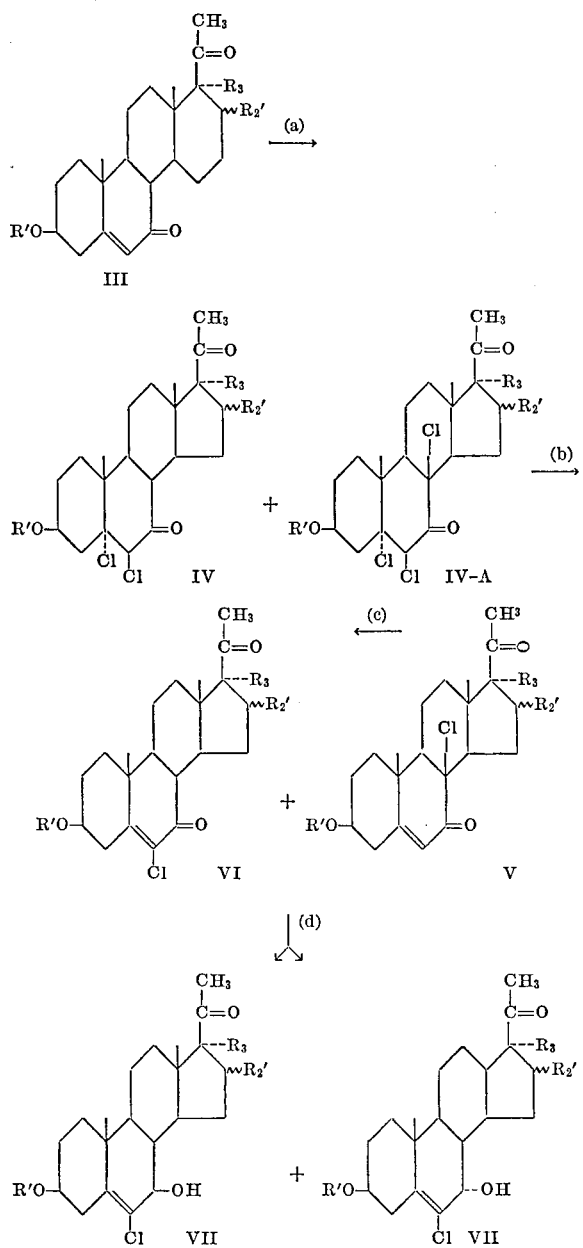

wherein R', R₃, and R₂' are as above.

When a compound of Formula III above is treated with chlorine as in step (a), a mixture is produced containing the compound of Formula IV and the compound of Formula IV–A. This chlorination procedure can be suitably effected by intermixing chlorine into a reaction medium which contains the compound of the Formula III. The step may be facilitated by the addition of a catalytic amount of an anhydrous mineral organic acid. Preferred are the hydrohalic acids, e.g., hydrogen chloride. The chlorination reaction may be carried out in an inert organic reaction medium. Any conventional inert organic solvent can be utilized as the reaction medium. Among the conventional inert organic solvents which can be utilized in carrying out the reaction of step (a) are included, ethers such as the lower alkyl ethers, for example, ethyl ether or dioxane; chlorinated hydrocarbons such as chloroform, carbon tetrachloride, ethylene chloride or methylene chloride or the like. The chlorine can be introduced into the reaction medium by conventional techniques, e.g., a solution containing the chlorine can be introduced into the reaction medium. Also a chlorine containing lower alkanoic acid solution, for example, chlorine in propionic acid is suitable for this purpose. The treatment with chlorine is suitably effected at low temperatures preferably between —40° C. and room temperature, i.e., 30° C. Generally, it is preferred to carry out this reaction at a temperature of from about —30° C. to about 0° C.

The compound of Formulae IV and IV–A can be separated by conventional means such as column chromatography if desired. However, this separation is not necessary since this mixture can be directly converted to the mixture of compounds of Formulae V and VI above by the reaction of step (b).

The mixture prepared in step (a) is converted into a mixture containing the compound of Formula V and the compound of Formula VI in accordance with step (b). The conversion can be effected in accordance with step (b) of the reaction sequence by treating the mixture containing the compound of Formula IV and the compound of Formula IV–A with a dehydrochlorinating agent under basic conditions. Thus, the dehydrochlorination can be carried out under basic conditions, i.e., in the presence of a proton acceptor. Any conventional proton acceptor can be utilized in carrying out this reaction. Among the conventional proton acceptors are included, nitrogen-containing heterocyclic bases, e.g., pyridine, picoline, or the like; or tri-lower alkylamines, e.g., triethyl amine; and alkali metal inorganic bases such as alkali metal hydroxides, e.g., sodium hydroxide or alkali bicarbonates, e.g., sodium bicarbonate. The proton acceptor can, if desired, constitute the reaction medium. However, if desired, other solvents can be utilized in combination with the proton acceptor. Any conventional inert organic solvent such as ethers including lower alkyl ethers, for example, ethyl ether or dioxane; chlorinated hydrocarbons such as chloroform or carbon tetrachloride can be employed. The dehydrochlorination reaction carried out in accordance with step (b) is suitably conducted between temperatures of 0° C. and 100° C. A low temperature range of 0° C. to 50° C. is preferred. The preferred proton acceptor, which is utilized in carrying out the reaction of step (b), is a nitrogen-containing heterocyclic base with pyridine being especially preferred.

The reaction of step (b) yields a mixture of the compound of Formula V and the compound of Formula VI. The compound of Formula V can be directly converted to the compound of Formula VI without separation from the mixture via reaction step (c). The reaction of step (c) is carried out by treating the mixture of compounds of the Formula V and compounds of the Formula VI with zinc in the presence of a lower alkanoic acid. The lower alkanoic acid can be utilized as the reaction medium in accordance with this invention. Any conventional lower alkanoic acid i.e., acetic acid, butyric acid, etc., can be utilized. Generally, it is preferred in carrying out this reaction to utilize acetic acid. In carrying out this reaction, temperature and pressure are not critical and this reaction can be carried out at room temperature and atmospheric pressure. However, if desired, higher or lower temperatures can be utilized. Generally, temperatures of from about 0° C. to 100° C. are utilized.

The compound of the Formula VI is converted via reaction step (d) to a mixture containing the compounds of the Formula VII and VIII. The reaction of step (d) is carried out by conventional reduction means such as treatment with lithium aluminum tri-t-butoxyhydride or alkali metal borohydride. This reduction reaction produces a mixture of the compound of Formula VII and the compound of the Formula VIII. The compound of the Formula VII above can be separated from the compound of the Formula VIII above by conventional means such as column chromatography.

Compounds of Formula VII and VIII which contain a lower alkanoyloxy group at the 3-position can be converted into the corresponding compounds which contain lower alkanoyloxy groups on both the 3 and 7 positions by treatment with a conventional lower alkanoylating agent such as a lower alkanoic acid anhydride or lower alkanoic acid. Any of the conventional alkanoylating conditions can be used in carrying out this alkanoylating reaction. The compound of Formula VII or VIII which contains a lower alkanoyloxy group on both the 3 and 7 positions can be converted to the corresponding 3,7-dihydroxy compound by conventional basic hydrolysis techniques such as treating the compounds of Formulae VII and VIII with an alkali metal hydroxide such as sodium hydroxide. In carrying out this basic hydrolysis at least two moles of the basic hydrolyzing agent is used per mole of the compound of Formula VII and VIII. Generally, it is preferred to utilize from two to five moles of the basic hydrolyzing agent per mole of the compounds of Formulae VII and VIII.

On the other hand, the compounds of Formula VII and VIII which contain lower alkanoyloxy groups at both the 3 and 7 positions can be converted into the corresponding 3-hydroxy-7-lower alkanoyloxy compounds by selective basic hydrolysis techniques, that is, by reacting 1 mole of the 3,7-di-lower alkanoyloxy compounds of Formulae VII and VIII with 1 mole of an alkali metal hydroxide.

Compounds of Formula VI which are useful as progestational agents are also intermediates for compounds of the Formula VII and VIII which are also useful as progestational agents. The compounds of the Formula VI can be converted into the corresponding 3-hydroxy compound by treating the compound of the Formula VI in the aforementioned manner with a basic hydrolyzing agent such as sodium hydroxide.

In accordance with another embodiment of this invention progestationally active compounds of the Formula I-A above where R is hydrogen and $R_5$ is lower alkanoyl, i.e., compounds of the formula:

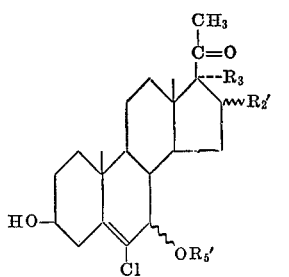

I-B wherein $R_2'$ and $R_3$ are as above, and $R_5'$ is lower alkanoyl; can be utilized as intermediates for known progestational agents of the formula:

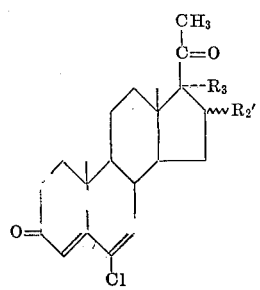

IX wherein $R_2'$ and $R_3$ are as above.

This conversion is effected by treating the compound of the Formula I-B above with an oxidizing agent such as chromium trioxide in an organic solvent such as glacial acetic acid, dimethylformamide or acetone; the Jones reagent (chromic acid, sulfuric acid and acetone solvent); or Oppenauer reagent. Any of the conditions conventional in oxidation with chromium trioxide, a Jones reagent or in Oppenauer oxidation (aluminum isopropoxide and a ketone, i.e., acetone, cyclohexanone) can be utilized to carry out this conversion. Generally, it is preferred to utilize the Jones reagent or chromium trioxide in carrying out this conversion. In carrying out this conversion by means of chromium trioxide or the Jones reagent, temperatures of from 0 to 50° C., are utilized with 0 to 30° C., being preferred. In carrying out this conversion by Oppenauer oxidation, conventional Oppenauer oxidizing conditions are utilized.

When $R_2$ is lower alkylidene, and $R_3$ is lower alkanoyl, and Y is

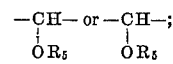

the compound of Formula I has the formula:

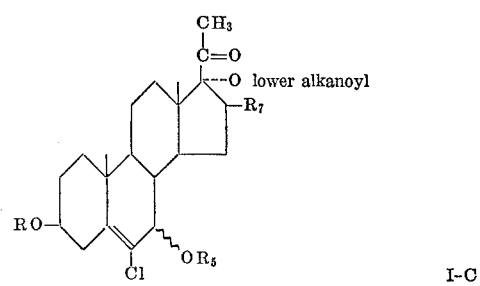

I-C wherein R and $R_5$ are as above, and $R_7$ is lower alkylidene.

In accordance with a preferred embodiment of this invention, $R_7$ is methylene. When R and $R_5$ in the compound of Formula I-C is lower alkanoyl the preferred group is acetyl. The preferred lower alkanoyl group on C-17 of Formula I-C above is acetyl. The compound of Formula I-C is prepared via a compound of the formula:

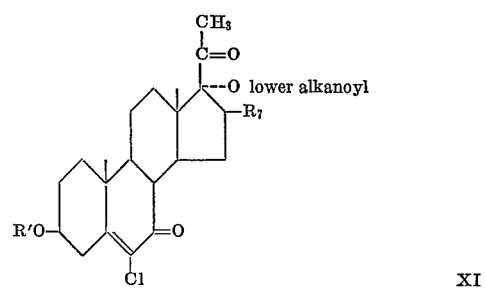

XI wherein R', $R_3$ and $R_7$ are as above.

In the compounds of Formula XI above which are active as progestational agents, R is preferably methylene and R' is preferably acetyl and the lower alkanoyl group on C-17 is preferably acetyl.

The compound of Formula I-C is produced via the following reaction scheme:

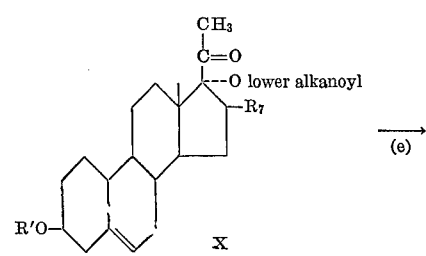

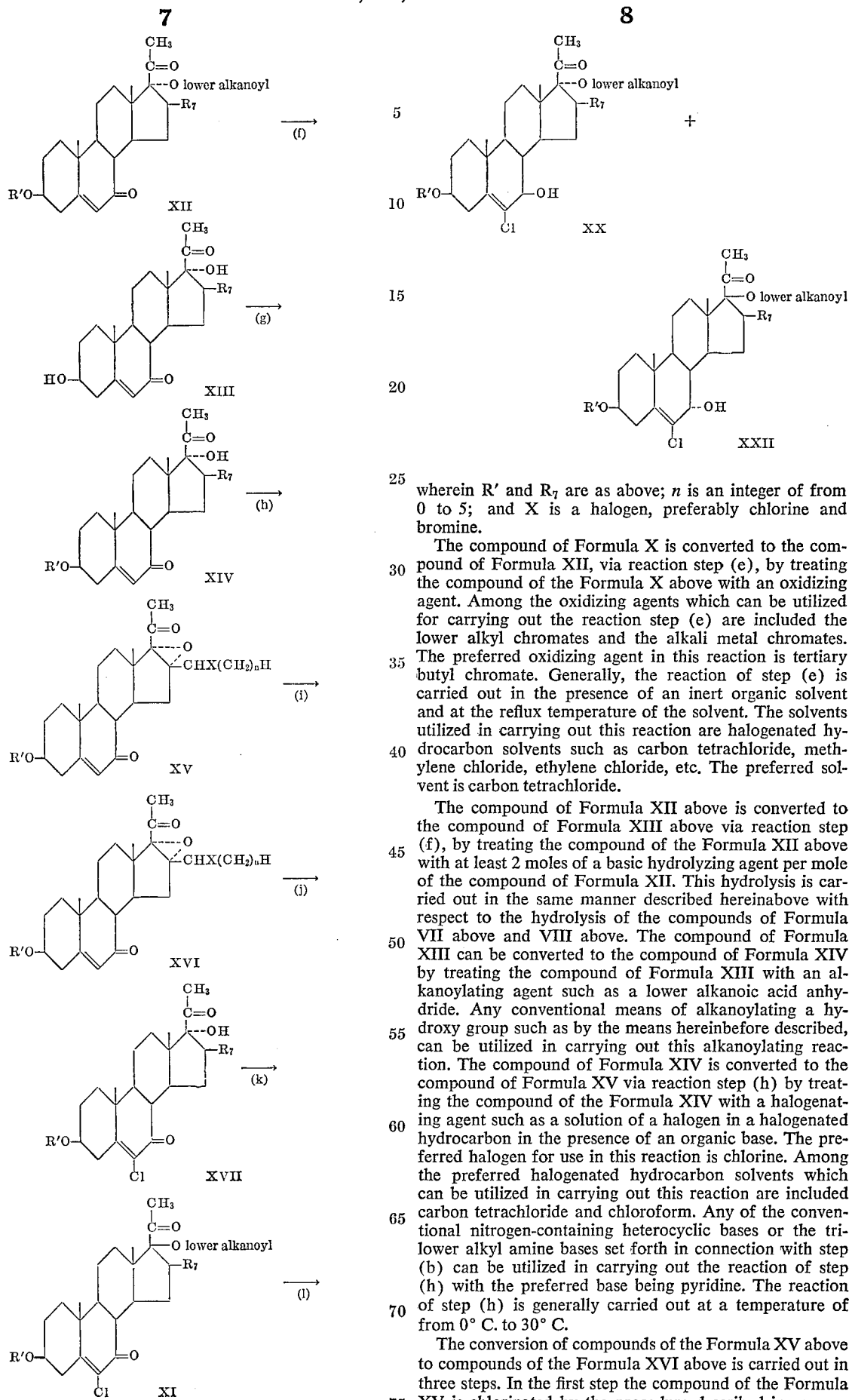

wherein R' and $R_7$ are as above; n is an integer of from 0 to 5; and X is a halogen, preferably chlorine and bromine.

The compound of Formula X is converted to the compound of Formula XII, via reaction step (e), by treating the compound of the Formula X above with an oxidizing agent. Among the oxidizing agents which can be utilized for carrying out the reaction step (e) are included the lower alkyl chromates and the alkali metal chromates. The preferred oxidizing agent in this reaction is tertiary butyl chromate. Generally, the reaction of step (e) is carried out in the presence of an inert organic solvent and at the reflux temperature of the solvent. The solvents utilized in carrying out this reaction are halogenated hydrocarbon solvents such as carbon tetrachloride, methylene chloride, ethylene chloride, etc. The preferred solvent is carbon tetrachloride.

The compound of Formula XII above is converted to the compound of Formula XIII above via reaction step (f), by treating the compound of the Formula XII above with at least 2 moles of a basic hydrolyzing agent per mole of the compound of Formula XII. This hydrolysis is carried out in the same manner described hereinabove with respect to the hydrolysis of the compounds of Formula VII above and VIII above. The compound of Formula XIII can be converted to the compound of Formula XIV by treating the compound of Formula XIII with an alkanoylating agent such as a lower alkanoic acid anhydride. Any conventional means of alkanoylating a hydroxy group such as by the means hereinbefore described, can be utilized in carrying out this alkanoylating reaction. The compound of Formula XIV is converted to the compound of Formula XV via reaction step (h) by treating the compound of the Formula XIV with a halogenating agent such as a solution of a halogen in a halogenated hydrocarbon in the presence of an organic base. The preferred halogen for use in this reaction is chlorine. Among the preferred halogenated hydrocarbon solvents which can be utilized in carrying out this reaction are included carbon tetrachloride and chloroform. Any of the conventional nitrogen-containing heterocyclic bases or the tri-lower alkyl amine bases set forth in connection with step (b) can be utilized in carrying out the reaction of step (h) with the preferred base being pyridine. The reaction of step (h) is generally carried out at a temperature of from 0° C. to 30° C.

The conversion of compounds of the Formula XV above to compounds of the Formula XVI above is carried out in three steps. In the first step the compound of the Formula XV is chlorinated by the procedure described in connection with step (a) to produce a mixture containing a compound of the formulae:

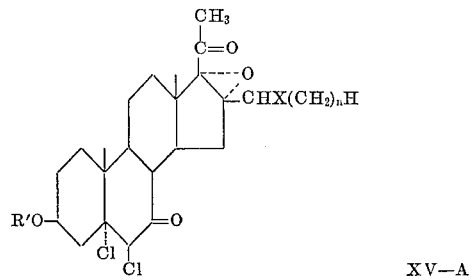

XV–A

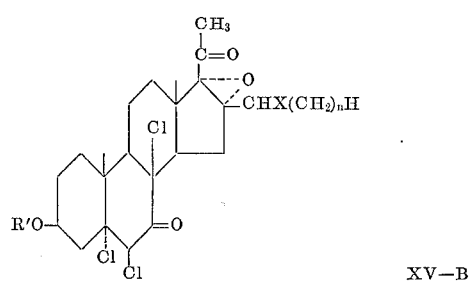

XV–B (wherein X, *n*, and R' are as above.

The mixture containing the compound of the Formula XV–A and the compound of the Formula XV–B can be converted by the reaction described in step (b) to a mixture containing the compound of the Formula XVI and a compound of the formula:

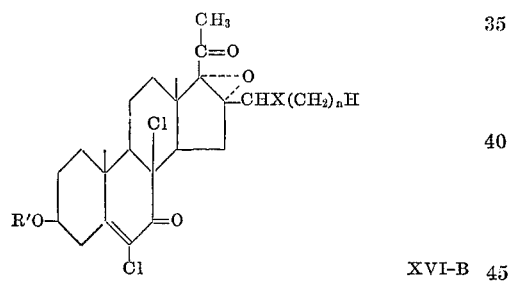

XVI–B wherein R', X and *n* are as above.

The compound of Formula XVI–B can be converted to the compound of the Formula XVI without isolation from the above mixture via the reaction described hereinbefore in connection with reaction step (c).

The compound of Formula XVI is converted to the compound of Formula XVII, via reaction step (j) by refluxing the compound of Formula XVI with an alkali metal iodide, preferably sodium iodide followed by the addition of lower alkanoic acid. Alternatively, the compound of Formula XVI can be converted to the compound of Formula XVII by refluxing the compound of Formula XVI with an alkali metal iodide in the presence of a lower alkanoic acid preferably acetic acid. This reaction is generally carried out in the presence of an inert organic solvent. Among the preferred solvents are the ketone solvents such as acetone, methyl ethyl ketone, etc.

The compound of the Formula XVII is converted to the compound of the Formula XI by treating the compound of the Formula XVII with a lower alkanoic acid anhydride in the presence of a strong acid. Any conventional strong acid such as perchloric acid, p-toluene sulfonic acid, etc. can be utilized in carrying out this reaction. If desired, this reaction can be carried out in a conventional inert organic solvent. Generally, the lower alkanoic acid anhydride can be utilized as the solvent medium. In carrying out this reaction, temperature and pressure are not critical and this reaction can be carried out at room temperature and atmospheric pressure. However, if desired, temperatures as low as 0° C. and as high as 100° C. can be utilized in carrying out this reaction.

The compound of Formula XI can be converted into a mixture consisting of the compound of Formula XX and the compound of the Formula XXI by means of reaction step (1). This reaction is carried out in the same manner as set forth in connection with reaction step (d). The compound of the Formula XX can be separated from the compound of the Formula XXI above by any conventional means such as column chromatography.

The 3-lower alkanoyloxy-7-hydroxy compounds of the Formulae XX and XXI can be converted into the corresponding compounds which contain lower alkanoyloxy groups on both the 3 and 7-positions in the manner described in connection with the conversion of compounds of the Formulae VII and VIII above. The compounds of Formulae XX annd XXI can be converted into the corresponding 3 and 7-dihydroxy compounds or the corresponding 3-hydroxy-7-lower alkanoyloxy compounds in the manner described in connection with compounds of the Formulae VII and VIII.

Compounds of the Formula XVII and Formula XI, besides being intermediates for compounds of the Formulae XX and XXI are also useful as progestational agents. The compounds of the Formula XI can be converted into the corresponding 3-hydroxy compound by treating the compound of the Formula XI with a basic hydrolyzing agent in the manner described hereinabove. Among the preferred basic hydrolyzing agents are included the alkali metal hydroxides such as sodium or potassium hydroxide.

Compounds of Formula I where $R_1$ is lower alkyl, R is lower alkanoyl, and Y is

have the following formula:

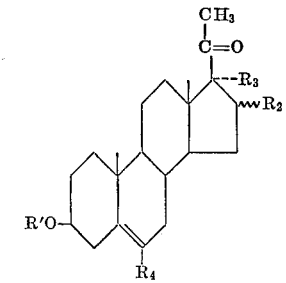

I–D wherein R', $R_2$, $R_3$, and $R_4$ are as above.

In a preferred embodiment of compounds of the Formula I–D, $R_9$ is methyl, $R_3$ is preferably a lower alkanoyloxy such as acetyloxy. In the compound of Formula I–D, $R_2$ is preferably hydrogen and R' is preferably acetyl.

The compound of Formula I–D above can be prepared from compounds of the formula:

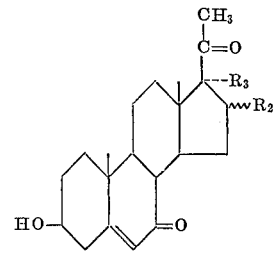

XXII wherein $R_2$ and $R_3$ are as above, by the following reaction scheme:

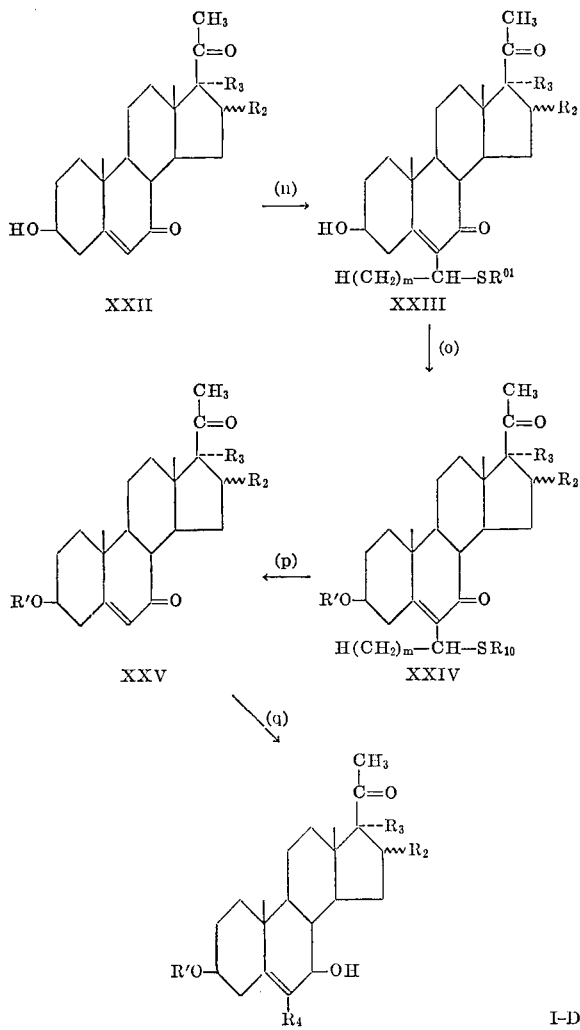

wherein $R_2$, $R_3$, $R'$ and $R_4$ are as above, $m$ is an integer from 0 to 5, and $R_{10}$ is lower alkyl, phenyl or phenyl lower alkyl.

The compound of Formula XXII above is converted to the compound of Formula XXIII above via reaction step (n) by treating the compound of Formula XXII with phenyl-mercaptan, a mercapto-lower alkyl, or a phenyl lower alkyl mercaptan in the presence of a lower alkyl aldehyde, preferably formaldehyde. The reaction of step (n) is carried out by utilizing tertiary alkylamines as the catalyst in the presence of an alcoholic organic solvent. Among the tertiary amine catalysts which can be utilized in this reaction are included, tertiary lower alkylamines or the tertiary lower alkanolamines such as triethanolamine, trimethylamine, triethylamine and tripropylamine, etc. with triethanolamine being the preferred catalyst. Any conventional alcohol solvent such as the lower alkanols can be utilized as the solvent medium. The preferred lower alkanol for use as a solvent is n-butanol. The lower alkyl aldehydes utilized in accordance with this reaction can be utilized in their polymeric form. Among the polymeric aldehydes which can be utilized, paraformaldehyde is preferred. The reaction of step (n) is carried out at the reflux temperature of the reaction medium.

A compound of the Formula XXIII above is converted to the compound of Formula XXIV above by treating the compound of the Formula XXIII above with a lower alkanoylating agent such as a lower alkanoic acid anhydride. Any conventional alkanoylating agent and any of the conditions conventionally utilized for alkanoylating can be used in carrying out the reaction of step (o).

The compound of Formula XXIV above can be converted to the compound of the Formula XXV above by treating the compound of the Formula XXIV above with Raney-nickel in the presence of an aldehyde or ketone solvent. The reaction of step (p) is carried out at the reflux temperature of the reaction medium. Any conventional ketone or aldehyde solvent can be uitlized as the inert organic solvent in this reaction. Generally, the preferred solvent is acetone.

The compound of Formula XXV is converted to the compound of Formula I-D by means of reaction step (q), by treating the compound of Formula XXV with a reducing agent such as lithium aluminum tri-t-butoxyhydride or an alkali metal borohydride. This reaction is carried out in the same manner as described in connection with reaction step (d).

In accordance with another embodiment of this invention, the compound of the Formula II above is prepared by reacting a compound of the formula:

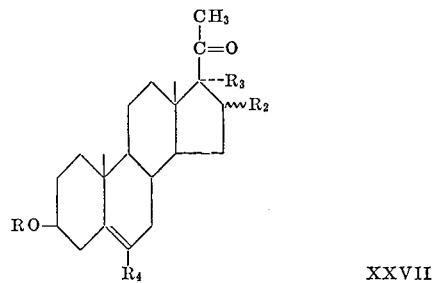

wherein R, $R_4$, $R_2$ and $R_3$ are as above, with chlorine dissolved in a halogenated hydrocarbon solvent in the presence of a proton acceptor. This reaction produces the compound of Formula II above in admixture with a compound of the formula:

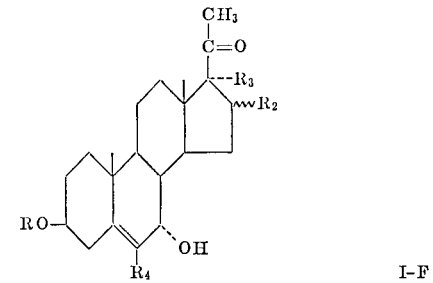

wherein R, $R_2$, $R_3$ and $R_4$ are as above.

In the reaction to produce a mixture containing the compound of Formula II and Formula I-F, the compound of Formula XXVII is reacted with chlorine dissolved in a halogenated hydrocarbon solvent. Furthermore, any conventional halogenated hydrocarbon can be utilized as the solvent medium. Among the preferred halogenated hydrocarbon solvents are included carbon tetrachloride, methylene chloride, ethylene chloride, etc. This reaction is carried out in the presence of a proton acceptor. Any conventional proton acceptor such as those mentioned in connection with step (b) can be utilized in carrying out this reaction. Especially preferred for use as the proton acceptor in this reaction is organic amine bases such as pyridine. This reaction is suitably conducted between a temperature of from —10° C. to 40° C., with temperatures of from 0° C. to 30° C. being preferred. The compound of Formula II can be separated from the compound of Formula I-F in the resulting mixture by conventional means such as column chromatography.

The compound of the Formula XXV in addition to being an intermediate for the compound of the Formula I-D is also useful as a progestational agent. The 3-ester compound of Formula XXV can be converted into the corresponding 3-hydroxy compound by treating the compound of the Formula XXV with a basic hydrolyzing agent such as sodium hydroxide in the manner set forth in connection with compounds of the Formula VI above.

Compounds of the Formula I–D and Formula I–F can be converted into the corresponding compounds which contain lower alkanoyloxy groups on both the 3 and 7-positions by conventional lower alkanoylating techniques such as those mentioned in connection with compounds of the Formula VII and Formula VIII above. On the other hand, the compounds of Formulae I–D and I–F which contain lower alkanoyloxy groups at both the 3 and 7-positions can be converted into the corresponding 3-hydroxy-7-lower alkanoyloxy compounds or the corresponding 3-hydroxy-7-hydroxy compounds by selective basic hydrolysis techniques such as those mentioned in connection with compounds of the Formulae VII and VIII above.

The compounds of Formulae I and II above are characterized by a high degree of progestational activity. Thus, the compounds of Formulae I and II above can be administered internally, for example, orally or parenterally, with dosage adjusted to individual requirements in the form of conventional pharmaceutical preparations; for example, they can be administered in conventional pharmaceutical solid or liquid forms such as tablets, pills, capsules, solutions, suspensions, emulsions or the like. These pharmaceutical preparations can contain conventional pharmaceutical carriers and excipients such as water, talc, corn starch, polyalkylene glycols, emulsifying agents, buffering agents, agents for the adjustment of osmotic pressure, Vaseline and the like. Though it is preferred to administer the endocrinologically useful compounds of this invention internally, the compounds of Formulae I and II above can also be administered topically. For this purpose, i.e., topical administration, these compounds can be administered in conventional topical administration forms such as ointments or creams, in combination with conventional topical carriers such as petrolatum, stearic acid or the like. Also, compositions containing an active ingredient of this invention can be subjected to conventional pharmaceutical processes such as sterilization or the like. Also, the pharmaceutical compositions of this invention can contain other active ingredients. Moreover, the endocrinologically active compounds can be administered as feed additives, and for this purpose can be admixed with conventional animal feeds or conventional animal feed premixes. Though as indicated dosage of the endocrinologically useful compounds of this invention should be adjusted to individual needs, i.e., the compounds of Formulae I and II, can be administered internally in daily dosage regimens of from about 0.005 mg./kg. to about 0.15 mg./kg. per day. The dosages can be administered in unit or divided dosage forms.

The usefulness of the compounds of this invention as progestational agents is indicated in animals, for example, the composition of this invention, when administered to estrogen primed immature female rabbits for five days show the presence of progestational activity by a secretory type endometrial response observed on histological sections prepared from rabbits' uteri and examined microscopically. A maximal response is demonstrated by progesterone at 200 mcg./day for five days. As exemplary of the progestational compounds of this invention, there can be named:

6-chloro-3β,7α,17α-trihydroxy-pregn-5-en-20-one 3,17-diacetate;
6-chloro-3β,7β-17α-trihydroxypregn-5-en-20-one 3,7,17-triacetate;
6-chloro-3β,17α-dihydroxypregn-5-en-7,20-dione;
6-chloro-3β,7α,17α-trihydroxy-16-methylenepregn-5-en-20-one 3,17-diacetate;
6-chloro-3β,7β,17α-trihydroxy-16-methylene-pregn-5-en-20-one 3,17-diacetate;
6-chloro-3β,17α-dihydroxy-16-methylenepregn-5-en-7,20-dione;
3β,5α,17α-trihydroxy-6-methylpregn-6-en-20-one 3,17-diacetate; and
3β,7α,17α-trihydroxy-6-methylpregn-5-en-20-one 3,17-diacetate;

which when examined in two rabbits, each showed progestational activity at 50 mcg./kg. day s.c. or less.

EXAMPLE 1

Preparation of 6-chloro-3β,17α-dihydroxypregn-5-en-7,20-dione 3,17-diacetate

To 30.00 g. (0.07 mole) of 3β,17α-dihydroxypregn-5-en-7,20-dione-3,17-diacetate in 200 ml. of chloroform (filtered from silica gel to remove alcohol) cooled to 5° was added 89.5 ml. (0.077 mole; 0.86 M) of a solution of chlorine in carbon tetrachloride in one portion. The reaction mixture was left at 3° for 16 hours and then at room temperature for 2½ hours. After washing with 5% by weight aqueous solution of sodium bicarbonate, the solution was dried (MgSO₄) and concentrated to yield 5,6 - dichloro - 3β,17α-dihydroxypregnane-7,20-dione 3,17-diacetate as an oil. The oil was dissolved in 250 ml. of pyridine and left at room temperature for 20 hours. The pyridine was removed at 1 mm. below 25°, 300 ml. of ether-methylene chloride (1:1) was added and the solution was washed with 1 N hydrochloric acid, 5% sodium bicarbonate solution, water and dried (MgSO₄). Concentration at reduced pressure gave an oil which was taken up in 1 l. of acetic acid and stirred for 2 hours at room temperature with 15 g. of zinc dust. The zinc was removed by filtration, washed with acetic acid and the filtrate was concentrated at 1 mm. below 25°. Water was added and the amorphous solid was extracted with methylene chloride. The extract was washed with 5% by weight of an aqueous sodium bicarbonate solution and dried (MgSO₄). Concentration at reduced pressure yielded an oil which was crystallized twice from methylene chloride-ether to give 6 - chloro-3β,17α-dihydroxypregn-5-en-7,20-dione 3,17-diacetate.

EXAMPLE 2

Preparation of 6 - chloro - 3β,7β,17α-trihydroxypregn-5-en-20-one 3,17-diacetate and 6-chloro-3β,7α,17α-trihydroxypregn-5-en-20-one 3,17-diacetate A solution of 5.1 g. (0.011 mole) of 6-chloro-3β,17α-dihydroxypregn-5-en-7,20-dione 3,17-diacetate in 50 ml. of anhydrous tetrahydrofuran was added dropwise under nitrogen to 8.4 g. (0.033 mole) of lithium aluminum tri-t-butoxyhydride in 80 ml. of anhydrous tetrahydrofuran with stirring over 20 minutes at room temperature. The reaction mixture was stirred at room temperature for 2½ hours, cooled in an ice bath and 10 ml. of acetone was added dropwise followed by 20 ml. of water. The mixture was concentrated to a small volume at reduced pressure, 250 ml. of chloroform was added followed by 150 ml. of water and 100 ml. of acetic acid. The organic layer was separated and the aqueous layer extracted with chloroform. The combined extracts were washed carefully with 5% by weight aqueous sodium bicarbonate solution, dried (MgSO₄) and concentrated at reduced pressure. Crystallization of the crude product from methylene chloride-diethyl ether yielded 6-chloro-3β,7β, 17α-trihydroxypregn-5-en-20-one 3,17-diacetate.

The filtrate from crystallization of 6-chloro-3β,7β,17α-trihydroxypregn-5-en-20-one 3,17-diacetate was chromatographed on 75 g. of silica gel. Elution with 5% by volume ethyl acetate 95% by volume benzene mixture gave several fractions containing pure 6-chloro-3β,7β,17α-trihydroxypregn-5-en-20-one 3,17-diacetate (by tlc). Crystallization of these combined fractions from methylene chloride-diethyl ether gave 6 - chloro - 3β,7β,17α-trihydroxypregn-5-en-20-one 3,17-diacetate, M.P. 212–214°. Continued elution with the 5% by volume ethyl acetate 95% by volume benzene solution and then with 10% by volume ethyl acetate 90% by volume benzene mixture gave several fractions containing pure 6-chloro-3β,7α,17α-trihydroxypregn - 5-en-20-one 3,17-diacetate. These fractions were combined and crystallized from methylene chloride-hexane to give 6-chloro-3β,7α,17α-trihydroxypregn-5-en-20-one 3,17-diacetate, M.P. 210.5–214°.

EXAMPLE 3

Preparation of 6-chloro-3β,7β,17α-trihydroxypregn-5-en-20-one 3,7,17-triacetate

A solution of 0.500 g. of 6-chloro-3β,7β,17α-trihydroxypregn-5-en-20-one 3,17-diacetate in 5 ml. of redistilled acetic anhydride and 5 ml. of anhydrous pyridine was left at room temperature for 20 hours. The solution was concentrated to dryness at 1 mm. Hg below 35°. Xylene was added and removed again to remove traces of acetic anhydride. Two crystallizations from methylene chloride-ether gave of 6-chloro-3β,7β,17α-trihydroxypregn-5-en-20 one 3,7,17-triacetate, M.P. 242–245°.

EXAMPLE 4

Preparation of 6-chloro-3β,7β-17α-trihydroxypregn-5-en-20-one

To a solution of 0.500 g. (1.07 mmole) in 25 ml. of methanol was added 1.2 ml. (1.18 mmole) of 1.0 N sodium hydroxide dropwise over 10 minutes. After stirring at room temperature for 70 minutes, 0.25 ml. of glacial acetic acid was added and the solvent was removed at reduced pressure. Water was added and the product was extracted with methylene chloride. The extract was dried (MgSO₄) and concentrated to a foam. Crystallization from methanol gave 6-chloro-3β,7β-17α-trihydroxypregn-5-en-20-one, M.P. 259.5–261°.

EXAMPLE 5

Preparation of 6-chloro-3β,7β-17α-trihydroxypregn-5-en-20-one 7,17-diacetate

To a solution of 0.200 g. (0.39 mmole) of 6-chloro-3β,7β,17α-trihydroxypregn-5-en-20-one 3,7,17-triacetate in 50 ml. of methanol was added 0.43 ml. (0.43 mmole) of 1 N sodium hydroxide. After stirring at room temperature for 4 hours, 0.2 ml. of acetic acid was added and the solvent was removed at reduced pressure. Water was added and the product was extracted with methylene chloride. The extract was dried (MgSO₄), concentrated and crystallized from methylene chloride-ether to yield 6 - chloro-3β,7β,17α-trihydroxypregn-5-en-20-one 7,17-diacetate, M.P. 244.5–246.5°.

EXAMPLE 6

Preparation of 6-chloro-17α-hydroxypregne-4,6-diene-3,20-dione-17-acetate

Jones reagent (0.06 ml.; 0.24 mmole) was added to 0.100 g. (0.21 mmole) of 6-chloro-3β,7β,17α-trihydroxypregn-5-en-20-one 7,17-diacetate in 12 ml. of acetone (distilled from potassium permanganate) with stirring in an ice bath. A stream of nitrogen was bubbled through the solution before and during the reaction. After stirring for 5 minutes, 1 ml. of methanol was added and the solvent was removed at reduced pressure. Water was added and the product was extracted with ethyl acetate. The extract was dried (MgSO₄) and concentrated to an oil. Preparative thin layer chromatography served to separate the product from some starting material. Crystallization of the product (48 mg.) from methylene chloride-ether gave 6-chloro - 17α - hydroxypregne-4,6-diene-3,20-dione-17-acetate.

EXAMPLE 7

Preparation of 3β,17α-dihydroxy-16-methylenepregn-5-en-7,20-dione diacetate

A t-butyl chromate solution was prepared by adding 226 g. (2.26 mole) of anhydrous chromium trioxide in 220 ml. of water dropwise at room temperature to 570 ml. (6.2 mole) of t-butyl alcohol. After the addition, the solution was stirred for 15 minutes at room temperature and then extracted with two 1.2 l. portions of carbon tetrachloride. The extract was washed with 1.2 l. of water, dried (Na₂SO₄) and concentrated to ~600 ml. at reduced pressure. The solution was diluted to 1.2 l. with carbon tetrachloride and then 315 ml. of glacial acetic acid and 90 ml. of acetic anhydride were added. This solution was added dropwise over 90 minutes to a solution of 90.4 g. (0.21 mole) of 3β,17α-dihydroxy-16-methylenepregn-5-en-20-one diacetate in 400 ml. of carbon tetrachloride, 210 ml. of glacial acetic acid and 60 ml. of acetic anhydride which was stirred and heated at 65°. The reaction mixture was stirred at 65° for 16 hours, filtered through Celite and then added dropwise over 45 minutes at 3° to 4 l. of 10% by weight aqueous oxalic acid solution. After stirring for 30 minutes at room temperature, the layers were separated and the organic layer was washed with two 1 l. portions of water, three 1 l. portions of 5% by weight aqueous sodium bicarbonate solution and finally with two 1 l. portions of water. The combined aqueous washed were extracted with 500 ml. of carbontetrachloride. The organic layers were combined, dried (MgSO₄) and concentrated at reduced pressure to yield a yellow solid. Two crystallizations from methylene chloride-ether gave 3β,17α-dihydroxy-16-methylene-pregn-5-en-7,20-dione diacetate, M.P. 174–176°.

EXAMPLE 8

Preparation of 3β,17α-dihydroxy-16-methylenepregn-5-en-7,20-dione 3-acetate

To a solution of 42.5 g. (0.096 mole) of 3β,17α-dihydroxy-16-methylenepregn-5-en-7,20-dione diacetate in 2.1 l. of methanol under nitrogen at room temperature was added dropwise over 15 minutes with stirring at room temperature 37.6 g. (0.67 mole) of potassium hydroxide dissolved in 40 ml. of water. After stirring at room temperature for 5 hours, the solid which crystallized was removed by filtration. The filtrate was concentrated to 500 ml. diluted with water and the solid was filtered. The combined solids were dried to yield 27.7 g. of 3β,17α-dihydroxy - 16 - methylenepregn - 5 - en-7,20-dione. This product was dissolved in 250 ml. of pyridine and 250 ml. of redistilled acetic anhydride and left at room temperature for 4½ hours. Concentration at ~1 mm. and 30° gave a tan solid which was crystallized from methylene chloride-ether to yield 3β,17α-dihydroxy-16-methylene-pregn-5-en-7,20-dione 3-acetate, M.P. 227–229°.

EXAMPLE 9

Preparation of 16β-chloromethyl-16α-17α-epoxy-3β-hydroxypregn-5-en-7,20-dione acetate To a solution of 5.0 g. (0.012 mole) of 3β,17α-dihydroxy-16-methylenepregn-5-en-7,20-dione 3-acetate in 100 ml. of anhydrous benzene, 35 ml. of chloroform (filtered from silica gel to remove alcohol) and 3 ml. of pyridine was added with stirring at 10° in one portion 17.4 ml. (0.86 M; 0.015 mole) of a solution of chlorine in carbon tetrachloride. After stirring at 10° for 30 minutes, the reaction mixture was washed with two 50 ml. portions of 3 N hydrochloric acid and with three 50 ml. portions of 5% by weight aqueous sodium bicarbonate solution. The organic layer was dried (MgSO₄) and concentrated at reduced pressure to yield a white foam. Crystallization from methylene chloride-ether gave 16β-chloromethyl - 16α,17α - epoxy - 3β - hydroxypregn-5-en-7,20-dione acetate, M.P. 155–157.5°.

EXAMPLE 10

Preparation of 6-chloro-16β-chloromethyl-16α,17α-epoxy-3β-hydroxypregn-5-en-7,20-dione acetate To 23.1 g. (0.05 mole) of 16β-chloromethyl-16α,17α-epoxy - 3β - hydroxypregn-5-en-7,20-dione acetate in 200 ml. of chloroform (filtered from silica gel to remove alcohol) at 3° was added in one potrion 49 ml. (1.36 M;

0.066 mole) of a solution of chlorine in carbon tetrachloride. The reaction mixture was kept at 3° for 17 hours, washed with 5% sodium bicarbonate solution dried (MgSO₄) and concentrated at reduced pressure to give a white solid. Crystallization from methylene chloride diethyl ether gave 5,6-dichloro-16β-chloromethyl-16α,17α-epoxy-3β-hydroxypregnane-7,20-dione acetate, M.P. 212–213°. A second crop was obtained from the filtrate.

The 5,6-dichloro compound (16.56 g; 0.033 mole) was added to 600 ml. of pyridine and stirred for 17 hours at room temperature. Removal of the pyridine at ~1 mm. and below 30° gave a brown solid which was dissolved in ethyl acetate and washed once with water, twice with 3 N hydrochloric acid, once with 5% by weight aqueous sodium bicarbonate and finally with water. Concentration of the solution at reduced pressure gave a yellow solid whch was dissolved in 500 ml. of acetic acid and stirred at room temperature for 1 hour with 16 g. of zinc dust to reduce any 8-chloro impurity. The zinc was removed by filtration and the filtrate was concentrated at ~1 mm. and below 30° The product was dissolved in ether-methylene chloride (2:1) and the solution was washed once with 5% by weight aqueous sodium bicarbonate solution, dried (MgSO₄) and concentrated at reduced pressure to yield a yellow solid. Crystallization from methylene chloride diethyl ether gave 6-chloro-16β-chloromethyl - 16α,17α - epoxy - 3β - hydroxypregn-5-en-7,20-dione acetate, M.P. 227.5–230°.

EXAMPLE 11

Preparation of 6-chloro-3β,17α-dihydroxy-16-methylenepregn-5-en-7,20-dione 3-acetate A solution of 10.78 g. (0.023 mole) of 6-chloro-16β-chloromethyl - 16α,17α - epoxy - 3β - hydroxypregn - 5-en-7,20-dione acetate in 650 ml. of acetone and 108 g. of sodium iodide was stirred and refluxed for 8½ hours. Glacial acetic acid (25 ml.) was added and reflux was continued for 3 hours. Most of the solvent was removed at reduced pressure, water was added and the product was extracted with methylene chloride. The extract was washed once with 5% by weight aqeuous sodium bicarbonate solution, dried (MgSO₄) and concentrated to a yellow solid. Crystallization from methylene chloride-diethyl ether gave 6-chloro-3β,17α-dihydroxy-16-methylenepregn-5-en-7,20-dione 3-acetate, M.P. 201–204°.

EXAMPLE 12

Preparation of 6-chloro-3β,17α-dihydroxy-16-methylenepregn-5-en-7,20-dione diacetate Redistilled acetic anhydride (96 ml.) in 300 ml. of ethyl acetate (distilled from lithium aluminum hydride) was treated with 1 ml. of 72% by weight aqueous perchloric acid and the resulting solution was diluted to 500 ml. with ethyl acetate. This solution (200 ml.) was added at room temperature in one portion to 4.0 g. (9.2 mmole) of 6-chloro - 3β,17α-dihydroxy -16 - methylenepregn-5-en-7,20-dione 3-acetate, in 200 ml. of anhydrous ethyl acetate. After stirring at room temperature for 10 minutes, the solution was washed with three portions of saturated aqueous sodium bicarbonate solution, dried (MgSO₄) and concentrated at reduced pressure (finally at ~1 mm. Hg) to yield a yellow solid. Crystallization from methylene chloride-ether gave 6-chloro-3β,17α-dihydroxy-16-methylenepregn-5-en-7,20-dione diacetate, M.P. 254–255°.

EXAMPLE 13

Preparation of 6-chloro-3β,7β,17α-trihydroxy-16-methylenepregn-5-en-20-one 3,17-diacetate and 6-chloro-3β,7α,17α - trihydroxy - 16 - methylenepregn-5-en-20-one 3,17-diacetate.

To a solution of 2.4 g. (9.4 mmole) of lithium aluminum tri-t-butoxyhydride in 20 ml. of anhydrous tetrahydrofuran under nitrogen at room temperature was added with stirring over a 20 minute period 1.50 g. (3.1 mmole) of 6 - chloro-3β,17α-dihydroxy-16-methylenepregn-5-en-7,20-dione diacetate in 40 ml. of anhydrous tetrahydrofuran. After stirring at room temperature for 5 hours, the reaction mixture was cooled in an ice bath during the addition of 30 ml. of acetone and 10 ml. of water. Most of the solvent was removed at reduced pressure and 75 ml. of chloroform was added followed by 80 ml. of 50% by weight aqueous acetic acid solution. The organic layer was separated and the aqueous layer extracted with chloroform. The combined organic layers were washed with three portions of 5% by weight aqueous sodium bicarbonate solution, dried (MgSO₄) and concentrated at reduced pressure. The crude product was chromatographed on 70 g. of silica gel. Elution with 4% by volume ethyl acetate-96% by volume benzene mixture gave several fractions containing pure 6-chloro-3β,7β,17α-trihydroxy-16-methylenepregn-5-en-20-one 3,17-diacetate (by tlc). These fractions were combined and crystallized from methylene chloride-hexane to yield 6-chloro-3β,7β,17α-trihydroxy - 16 - methylenepregn-5-en-20-one 3,17-diacetate, M.P. 209.5–212.5°.

Elution with 5% ethyl acetate-benzene gave several fractions containing pure 6-chloro-3β,7α,17α-trihydroxy-16-methylenepregn-5-en-20-one 3,17-diacetate (by tlc). These fractions were combined and crystallized from ethyl acetate-hexane mixture to yield 6-chloro-3β,7α,17α-trihydroxy - 16 - methylenepregn - 5 - en - 20 - one 3,17-diacetate, M.P. 187.5–188.5°.

EXAMPLE 14

Preparation of 6-chloro-3β,7β,17α-trihydroxy-16-methylenepregn-5-en-20-one triacetate To 0.600 mg. of 6-chloro-3β,7β,17α-trihydroxy-16-methylenepregn-5-en-20-one 3,17-diacetate was added 6.0 ml. of pyridine and 6.0 ml. of redistilled acetic anhydride and the solution was left at room temperature for 18 hours. The solution was concentrated to dryness at 1 mm. and the resultant white solid was crystallized from ethyl acetate to yield 6-chloro-3β,7β,17α-trihydroxy-16-methylenepregn-5-en-20-one tritcetate, M.P. 235–238°.

EXAMPLE 15

Preparation of 6-chloro-3β,7β,17α-trihydroxy-16-methylenepregn-5-en-20-one

To 300 mg. (0.63 mmole) of 6-chloro-3β,7β,17α-trihydroxy-16-methylenepregn-5-en-20-one 3,17 - diacetate dissolved in 15 ml. of methanol at room temperature was added 0.69 ml. (0.69 mmole) of 1 N sodium hydroxide. After stirring at room temperature for 2 hours, 0.25 ml. of acetic acid was added and the solvent was removed at reduced pressure. Water was added and the product was extracted with methylene chloride. The extract was dried (MgSO₄) and concentrated at reduced pressure to yield a foam. Crystallization from ethyl acetate gave 6-chloro-3β,7β,17α-trihydroxy-16-methylenepregn - 5 - en-20-one, M.P. 215–221°.

EXAMPLE 16

Preparation of 6-chloro-3β,7β,17α-trihydroxy-16-methylenepregn-5-en-20-one 7,17-diacetate To 0.324 g. (0.62 mmole) of 6-chloro-3β,7β,17α-trihydroxy-16-methylenepregn-5-en-20-one triacetate in 65 ml. of methanol at room temperature was added 0.69 ml. (0.69 mmole) of 1 N sodium hydroxide. The solution was stirred at room temperature for 4 hours, 0.25 ml. of acetic acid was added and the solvent was removed at reduced pressure to yield a white solid. Water was added and the product was extracted with methylene chloride. The extract was dried (MgSO₄) and concentrated to a foam. Crystallization from ethyl acetate gave 6-chloro-3β,7β,17α-trihydroxy-16-methylenepregn-5-en - 20 - one 7,17-diacetate, M.P. 228–232°.

EXAMPLE 17

Preparation of 3β,17α-dihydroxy-6-phenylthiomethylpregn-5-en-7,20-dione, 3,17-diacetate To 43.0 g. (0.1 mole) of 3β,17α-dihydroxypregn-5-en-7,20-dione 3,17-diacetate in 2.5 l. of methanol and 200 ml. of dioxane at room temperature 110 ml. (0.11 mole) of 1.0 N sodium hydroxide was added dropwise over a 1 hour period. After stirring for 1 hour more, 10 ml. of acetic acid and 200 ml. of water were added and most of the methanol was removed under reduced pressure. The crystalline solid was removed by filtration, washed with water and air dried to yield 36.65 g. of 3β,17α-dihydroxypregn-5-en-7,20-dione-17-acetate. This 3-hydroxy compound (36.65 g.) was dissolved in 150 ml. of n-butanol and treated with 50 ml. of thiophenol, 70 ml. of triethanolamine and 30 g. of paraformaldehyde. The reaction mixture was stirred and refluxed for 43 hours, 25 ml. of thiophenol and 15 g. of paraformaldehyde were added and reflux was continued for 60 hours more. After pouring into 1 l. of 3 N HCl and ice, the product was extracted with benzene (2× 1 l.). The extract was washed with three 500 ml. portions of 6 N sodium hydroxide, 500 ml. of 1 N HCl, 1 l. of water, dried (MgSO$_4$) and concentrated under reduced pressure. The residual oil was chromatographed on 1.2 kg. of silica gel. Elution with 5% by volume ethyl acetate, 95% by volume benzene mixture gave 12.57 g. of an unidentified compound. Further elution with 7.5% and 12.5% ethyl acetate-benzene gave minor impurities. Finally the product 3β,17α-dihydroxy-6-penylthiomethylpregn-5-ene-7,20-dione 17-acetate, was eluted with 20% by volume ethyl acetate by volume benzene. This crude product was acetylated with 100 ml. of acetic anhydride in 100 ml. of pyridine at room temperature for 16 hours. The solvent was removed ~1 mm. to yield a solid residue which was crystallized from methylene chloride-diethyl ether to give 3β,17α-dihydroxy-6-phenylthiomethylpregn-5-en-7,20-dione 3,17-diacetate, M.P. 155–157°.

EXAMPLE 18

Preparation of 3β,17α-dihydroxy-6-methylpregn-5-en-7,20-dione diacetate

Raney nickel sludge (40 ml.) was washed four times with acetone by decantation and then refluxed with 200 ml. of acetone for 30 minutes. A solution of 3β,17α-dihydroxy-6-phenylthiomethylpregn-5-en-7,20 - dione 3,17 diacetate (3.70 g.) in 50 ml. of acetone was added and the reaction mixture was stirred and refluxed for 2½ hours. The Raney nickel was filtered and washed with two 100 ml. portions of hot ethanol. The combined filtrate was concentrated to dryness under reduced pressure and the residue was crystallized from methylene chloride-diethyl ether to yield 3β,17α-dihydroxy-6-methylpregn-5-en-7,20-dione diacetate, M.P. 180–182°.

EXAMPLE 19

Preparation of 3β,7β,17α-trihydroxy-6-methylpregn-5-en-20-one 3,17-diacetate

To 267 mg. (0.6 mmole) of 3β,17α-dihydroxy-6-methylpregn-5-en-7,20-dione diacetate dissolved in 3 ml. of anhydrous tetrahydrofuran at room temperature was added 15 ml. (1.5 mmole) of 0.1 M lithium borohydride in tetrahydrofuran. After stirring for 27 hours, acetic acid was added to decompose the excess hydride. The solvent was removed under reduced pressure, water was added and the product was extracted with methylene chloride. The extract was washed with 5% by weight aqueous sodium bicarbonate solution, dried (MgSO$_4$) and concentrated under reduced pressure. Careful chromatography of the crude product on 15 g. of silica gel and slowly increasing the polarity of the solvent from 1% by volume to 5% by volume ethyl acetate in benzene gave some residual starting material. The desired product was eluted with 5% by volume and finally 10% by volume ethyl acetate-benzene. Crystallization of the combined fractions from ether-hexane gave 3β,7β,17α - trihydroxy-6-methylpregn-5-en-20-one, 3,17-diacetate, M.P. 171–174°.

EXAMPLE 20

Preparation of 3β,5α,17α-trihydroxy-6-methylpregn-6-en-20-one 3,17-diacetate and 3β,7α,17α-trihydroxy-6-methylpregn-5-en-20--one 3,17-diacetate To 1.0011 g. (2.3 mmole) of 3β,17α - dihydroxy-6-methylpregn-5-en-20-one diacetate in 10 ml. of carbon tetrachloride and 0.1 ml. of pyridine cooled in an ice bath was added 2.50 ml. (2.6 mmole) of 1.04 M chlorine in carbon tetrachloride over a 20 min. period with stirring. An immediate precipitate of pyridine hydrochloride was observed. After stirring 30 min. in the ice bath, 5 ml. of 5 percent by weight aqueous sodium bicarbonate solution was added and the organic layer separated, dried (MgSO$_4$) and concentrated to dryness under reduced pressure. Tlc of the crude product revealed the presence of approximately equal amounts of three compounds. Preparative tlc on 13 Brinkman silica gel plates served to separate the compounds. The fastest moving compound was unstable and was not obtained in pure form. The middle spot was eluted from the silica gel with chloroformethanol (1:1 parts by volume) and crystallized from ether-hexane to yield 3β,5α,17α-trihydroxy-6-methylpregn-6-en-20-one 3,17-diacetate (M.P. 214.5–216.5°).

The slowest moving spot was eluted from the silica gel with chloroform-ethanol (1:1 parts by volume) and crystallized from ether-hexane to yield 3β,7α,17α-trihydroxy-6-methylpregn-5-en-20-one 3,17-diacetate.

EXAMPLE 21

Tablet formulation

| | Per tablet, mg. |
|---|---|
| 6-chloro-3β,7β,17α - trihydroxypregn-5-en-20-one triacetate | 2.55 |
| Dicalcium phosphate, unmilled | 232.45 |
| Corn starch | 12.50 |
| Magnesium stearate | 2.50 |
| Total weight | 250.00 |

Procedure (1) 6-chloro-3β,7β,17α - trihydroxypregn-5-en-20-one triacetate and corn starch were blended in a suitable size mixer.

(2) The mix was then blended with an equal quantity of dicalcium phosphate.

(3) The mixture was blended for five minutes with the balance of the dicalcium phosphate and magnesium stearate.

(4) The mixture was then compressed.

EXAMPLE 22

A tablet was formed in the same manner as in Example 21 utilizing 6-chloro - 3β,7β,17α - trihydroxypregn-5-en-20-one 7,17-diacetate.

EXAMPLE 23

A tablet was formed in the same manner as in Example 21 utilizing 6-chloro - 3β,7α,17α - trihydroxy-16-methylenepregn-5-en-20-one, 3,17-diacetate.

EXAMPLE 24

A tablet was formed in the same manner as in Example 21 utilizing 6-chloro - 3β,7β,17α - trihydroxy-16-methylenepregn-5-en-20-one triacetate.

EXAMPLE 25

A tablet was formed in the same manner as in Example 21 utilizing 3β,7α,17α-trihydroxy-6-methylpregn-5-en-20-one 3,17-diacetate.

EXAMPLE 26

Capsule formulation

| | Per capsule, mg. |
|---|---|
| 6 - chloro - 3β,7β,17α - trihydroxypregn-5-en-20-one triacetate | 5 |
| Lactose | 178 |
| Corn starch | 37 |
| Talc | 5 |
| Total weight | 225 |

Procedure (1) 6-chloro - 3β,7β,17α - trihydroxypregn-5-en-20-one triacetate was mixed with the lactose and corn starch in a suitable mixer.

(2) The mixture was further blended by passing through a Fitzpatrick Comminuting Machine with a #1A Screen with knives forward.

(3) The blended powder was returned to the mixer, the talc added and blended thoroughly. The mixture was then filled into #4 hard shell gelatin capsules on a Parke Davis capsulating machine (any similar type machine may be used).

EXAMPLE 27

A capsule was formed in the same manner as in Example 26 utilizing 6-chloro-3β,7β,17α-trihydroxypregn-5-en-20-one 7,17-diacetate.

EXAMPLE 28

A capsule was formed in the same manner as in Example 26 utilizing 6-chloro-3β,7α,17α-trihydroxy - 16 - methylenepregn-5-en-20-one 3,17-diacetate.

EXAMPLE 29

A capsule was formed in the same manner as in Example 26 utilizing 6-chloro-3β,7β,17α-trihydroxy-16-methylenepregn-5-en-20-one triacetate.

EXAMPLE 30

A capsule was formed in the same manner as in Example 26 utilizing 3β,7α,17α-trihydroxy-6-methylpregn-5-en-20-one 3,17-diacetate.

EXAMPLE 31

Suppository formulation

| | Per 1.3 gm. suppository, gm. |
|---|---|
| 6-chloro-3β,7β,17α-trihydroxy-pregn - 5 - en-20-one triacetate | 0.005 |
| Wecobee M¹ | 1.250 |
| Carnauba wax | 0.045 |

¹ Cocoa Butter—coconut derived fat having a melting point of 96° F. to 98° F.

Procedure (1) The Wecobee M and the carnauba wax were melted in a suitable size glass lined container (stainless steel may also be used), mixed well and cooled to 45° C.

(2) 6 - chloro - 3β,7β,17α - trihydroxypregn - 5 - en-20-one triacetate, which had been reduced to a fine powder with no lumps, was added and stirred until completely and uniformly dispersed.

(3) The mixture was poured into suppository molds to yield suppositories having an individual weight of 1.3 grams.

(4) The suppositories were cooled and removed from molds. They were individually wraped in wax paper for packaging (foil may also be used).

EXAMPLE 32

A suppository was formed in the same manner as in Example 31 utilizing 6-chloro-3β,7β,17α-trihydroxypregn-5-en-20-one, 7,17-diacetate.

EXAMPLE 33

A suppository was formed in the same manner as in Example 31 utilizing 6-chloro-3β,7α,17α-trihydroxy-16-methylenepregn-5-en-20-one 3,17-diacetate.

EXAMPLE 34

A suppository was formed in the same manner as in Example 31 utilizing 6-chloro-3β,7β,17α-trihydroxy-16-methylenepregn-5-en-20-one triacetate.

EXAMPLE 35

A suppository was formed in the same manner as in Example 31 utilizing 3β,7α,17α-trihydroxy-6-methylpregn-5-en-20-one 3,17-diacetate.

EXAMPLE 36

0.1% cream

| | Mg. per gram |
|---|---|
| 6 - chloro - 3β,7β,17α - trihydroxypregn - 5 - en-20 - one - triacetate | 1.00 |
| Stearyl alcohol | 100.00 |
| Cetyl alcohol | 15.00 |
| White petrolatum | 70.00 |
| Methyl parahydroxybenzoate, U.S.P. | 2.00 |
| Propyl parahydroxybenzoate, U.S.P. | 0.50 |
| Isopropyl palmitate | 60.00 |
| Polyoxyl 40 stearate, U.S.P. | 40.00 |
| Propylene glycol | 120.00 |
| Disodium versenate | 0.10 |
| Distilled water | 597.16 |

Procedure (1) The stearyl alcohol, cetyl alcohol, petrolatum, propyl parahydroxybenzoate, isopropyl palmitate and polyoxyl 40 stearate were melted at 75° C. The mixture was cooled to and maintained at 70° C.

(2) Disodium versenate and methyl parahydroxybenzoate were dissolved in hot distilled water to which was added the propylene glycol. The solution was mixed at 75° C. and slowly added to the oil solution prepared previously, using slow agitation. The emulsion was gradually cooled with slow stirring.

(3) When the temperature of the ointment reached 55° C. a solution of 6-chloro-3β,7β,17α-trihydroxypregn-5-en-20-one triacetate was added and mixed with the ointment.

(4) When the temperature of the ointment reached 50° C. cold water was circulated in the jacket of the kettle and the ointment was cooled to 30° C. with stirring. The ointment was then transferred to storage containers.

EXAMPLE 37

A 0.1% cream was formed in the same manner as in Example 36 utilizing 6-chloro-3β,7β,17α-trihydroxypregn-5-en-20-one 7,17-diacetate.

EXAMPLE 38

A 0.1% cream was formed in the same manner as in Example 36 utilizing 6-chloro-3β,7α,17α-trihydroxy-16-methylenepregn-5-en-20-one 3,17-diacetate.

EXAMPLE 39

A 0.1% cream was formed in the same manner as in Example 36 utilizing 6-chloro-3β,7β,17α-trihydroxy-16-methylenepregn-5-en-20-one triacetate.

EXAMPLE 40

A 0.1% cream was formed in the same manner as in Example 36 utilizing 3β,7α,17α-trihydroxy-6-methylpregn-5-en-20-one 3,17-diacetate.

What is claimed is:
1. A compound of the formula:

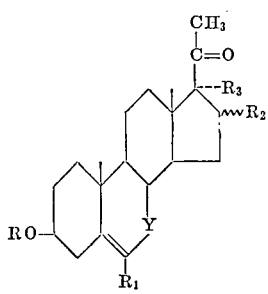

wherein R is hydrogen and lower alkanoyl;
$R_1$ is chlorine or lower alkyl; Y is

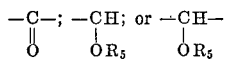

$R_2$ is hydrogen, hydroxy, lower alkylidene, and lower alkyl;
$R_3$ is hydroxy, lower alkanoyloxy or taken together with $R_2$ form a moiety of the formula

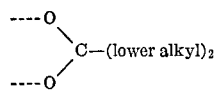

and $R_5$ is hydrogen or lower alkanoyl.

2. The compound of claim 1 wherein $R_1$ is chlorine and Y is

3. The compound of claim 2 wherein said compound is 6-chloro-3β,17α-dihydroxypregn-5-en-7,20-dione, 3,17-diacetate.

4. The compound of claim 2 wherein said compound is 6-chloro-3β,17α-dihydroxy - 16 - methylenepregn-5-en-7,20-dione-3-acetate.

5. The compound of claim 2 wherein said compound is 6-chloro - 3β,17α - dihydroxy-16-methylenepregn-5-en-7,20-dione diacetate.

6. The compound of claim 1 wherein Y is

and $R_1$ is lower alkyl.

7. The compound of claim 6 wherein said compound is 3β,17α - dihydroxy - 6 - methylpregn-5-en-7,20-dione diacetate.

8. The compound of claim 1 wherein Y is

and $R_1$ is chlorine.

9. The compound of claim 8 wherein said compound is 6-chloro - 3β,7β,17α - trihydroxypregn - 5-en-20-one 3,17-diacetate.

10. The compound of claim 8 wherein said compound is 6-chloro - 3β,7β,17α - trihydroxypregn-5-en-20-one 3,7,17-triacetate.

11. The compound of claim 8 wherein said compound is 6-chloro-3β,7β,17α-trihydroxy - 16 - methylenepregn-5-en-20-one 3,17-diacetate.

12. The compound of claim 1 wherein Y is

and $R_1$ is lower alkyl.

13. The compound of claim 12 wherein said compound is 3β,7β,17α - trihydroxy-6-methylpregn-5-en-20-one 3,17-diacetate.

14. The compound of claim 1 wherein Y is

and $R_1$ is chlorine.

15. The compound of claim 14 wherein said compound is 6-chloro-3β,7α,17α-trihydroxy-pregn-5-en-20-one 3,17-diacetate.

16. The compound of claim 14 wherein said compound is 6-chloro-3β,7α,17α-trihydroxy-16-methylenepregn-5-en-20-one 3,17-diacetate.

17. The compound of claim 1 wherein Y is

and $R_1$ is lower alkyl.

18. The compound of claim 17 wherein said compound is 3β,7α,17α-trihydroxy-6-methylpregn-5-en-20-one 3,17-diacetate.

19. A compound of the formula:

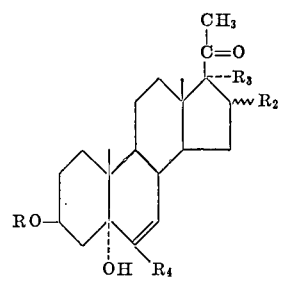

wherein R is hydrogen or lower alkanoyl; $R_2$ is hydrogen, hydroxy, lower alkylidene, or lower alkyl; $R_3$ is hydroxy, lower alkanoyloxy or taken together with $R_2$ form a moiety of the formula:

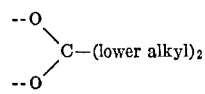

and $R_4$ is lower alkyl.

20. The compound of claim 19 wherein said compound is 3β,5α,17α - trihydroxy-6-methylpregn-6-en-20-one 3,17-diacetate.

21. A compound of the formula:

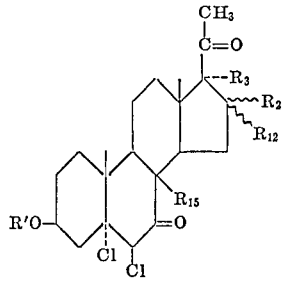

wherein R' is lower alkanoyl; $R_2$ is hydrogen, hydroxy, lower alkyl, halo lower alkyl; $R_3$ is hydroxy, lower alkanoyloxy, or taken together with $R_2$ form a moiety of the formula:

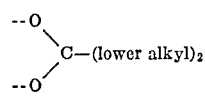

and $R_{12}$ is hydrogen, with the proviso that when $R_2$ is halo lower alkyl, $R_3$ and $R_{12}$ taken together form an oxido moiety and $R_{15}$ is hydrogen or chlorine.

22. The compound of claim 21 wherein said compound is 5,6-dichloro-3β,17α-dihydroxypregnane-7,20-dione 3,17-diacetate.

23. The compound of claim 21 wherein said compound is 5,6-dichloro-16β-chloromethyl - 16α,17α - epoxy-3β-hydroxypregnane-7,20-dione acetate.

24. A compound of the formula:

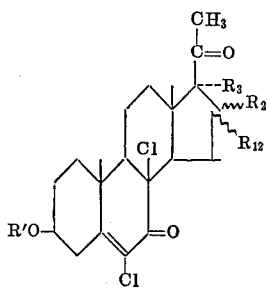

wherein R' is lower alkanoyl; $R_2$ is hydrogen, hydroxy, lower alkyl, halo lower alkyl; $R_3$ is hydroxy, lower alkanoyloxy, or taken together with $R_2$ form a

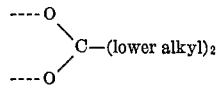

and $R_{12}$ is hydrogen, with the proviso that when $R_2$ is halo lower alkyl, $R_3$ and $R_{12}$ taken together form an oxido moiety.

25. The compound of claim 24 wherein said compound is 3β,17α-dihydroxy-6,8-dichloropregn-5-en-7,20-dione diacetate.

26. A compound of the formula

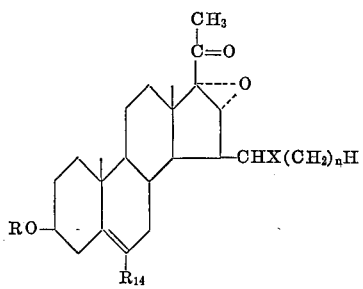

wherein R is hydrogen and lower alkanoyl; $R_{14}$ is hydrogen or chlorine; X is halogen; and $n$ is an integer from 0 to 5.

27. The compound of claim 24 wherein said compound is 6β-chloro-16β-chloromethyl-16α,17α-epoxy-3β-hydroxypregn-5-en-7,20-dione acetate.

28. The compound of claim 24 wherein said compound is 16β-chloromethyl - 16α,17α - epoxy-3β-hydroxypregn-5-en-7,20-dione acetate.

29. A compound of the formula:

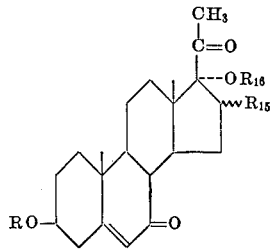

wherein R and $R_{16}$ are hydrogen or lower alkanoyl; and $R_{15}$ is lower alkylidene.

30. The compound of claim 29 wherein said compound is 3β,17α-dihydroxy - 16 - methylenepregn-5-en-7,20-dione diacetate.

31. A compound of the formula:

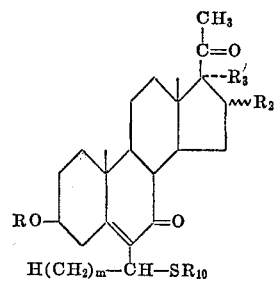

wherein R is hydrogen or lower alkanoyl, $R_2$ is hydrogen, hydroxy, lower alkylidene, and lower alkyl; $R_3$ is hydroxy, lower alkanoyloxy or taken together with $R_2$ form a moiety of the formula:

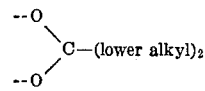

$m$ is an integer from 0 to 5 and $R_{10}$ is lower alkyl or phenyl lower alkyl or phenyl.

32. The compound of claim 31 wherein said compound is 3β,17α - dihydroxy-6-phenylthiomethylpregn-5-en-7,20-dione 3,17-diacetate.

33. A process for producing a compound of the formula:

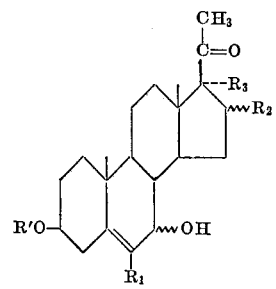

wherein R' is lower alkanoyl; $R_1$ is chlorine or lower alkyl; $R_2$ is hydrogen, hydroxy, lower alkylidene, and lower alkyl; $R_3$ is hydroxy, lower alkanoyloxy or taken together with $R_2$ form a moiety of the formula:

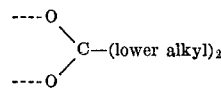

comprising treating a compound of the formula:

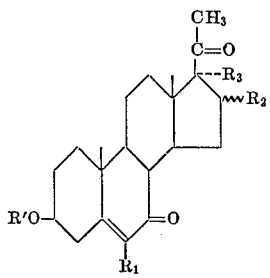

wherein R', $R_1$, $R_2$ and $R_3$ are as above, with a reducing agent selected from the group consisting of lithium aluminium tri-t-butoxy hydride and alkali metal borohydride.

34. A process for producing a compound of the formula:

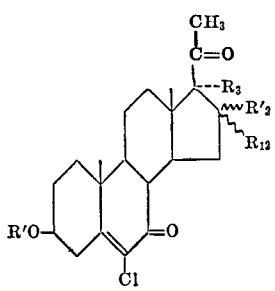

wherein R' is lower alkanoyl; R'$_2$ is hydrogen, hydroxy, lower alkyl, and -halo lower alkyl; R$_3$ is hydroxy, lower alkanoyloxy or taken together with R$_2$ form a moiety of the formula:

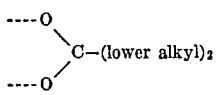

R$_{12}$ is hydrogen with the proviso that when R'$_2$ is -halo lower alkyl, R$_3$ and R$_{12}$ taken together form an oxido moiety, comprising treating a compound of the formula:

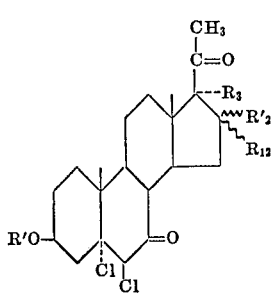

wherein R', R'$_2$, R$_3$ and R$_{12}$ are as above, with a proton acceptor.

35. The process of claim 39 wherein said proton acceptor is a heterocyclic amine base.

36. A process of producing a compound of the formula:

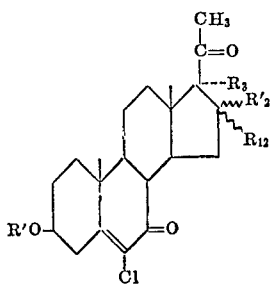

wherein R' is a lower alkanoyl; R$_3$ is hydroxy, lower alkanoyloxy; R'$_2$ is hydrogen, hydroxy, lower alkyl, α-halo lower alkyl and taken together with R$_3$ form a moiety of the formula:

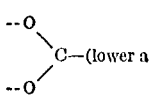

R$_{12}$ is hydrogen with the proviso that when R'$_2$ is a α-halo lower alkyl, R$_3$ and R$_{12}$ form an oxido moiety, comprising treating a compound of the formula:

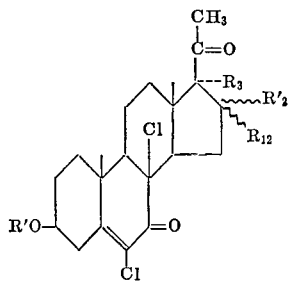

wherein R', R'$_2$, R$_3$ and R$_{12}$ are as above, with zinc in the presence of a lower alkanoic acid.

37. A process for producing a compound of the formula:

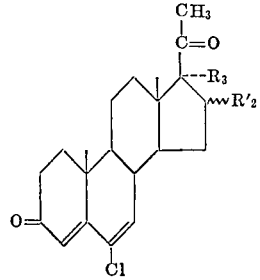

wherein R$_3$ is hydroxy lower alkanoyloxy; R'$_2$ is hydrogen, hydroxy, lower alkylidene and lower alkyl and taken together with R$_3$ form a moiety of the formula:

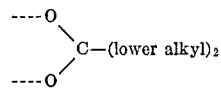

comprising oxidizing a compound of the formula:

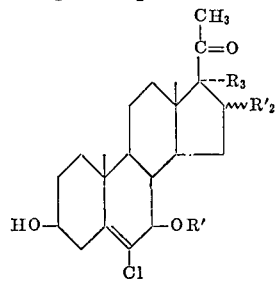

wherein R$_1$ is lower alkanoyl; and R$_3$ and R'$_2$ are as above; with an oxidizing agent selected from the group consisting of the Jones reagent, Oppenauer reagent and chromium trioxide.

38. A process for producing a compound of the formula:

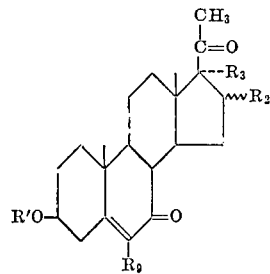

wherein R' is lower alkanoyl; R$_9$ is lower alkyl; R$_2$ is hydrogen, hydroxy, lower alkylidene, lower alkyl; R$_3$ is hydroxy, lower alkanoyloxy or taken together with R$_2$ form a moiety of the formula:

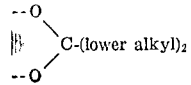

comprising refluxing a compound of the formula:

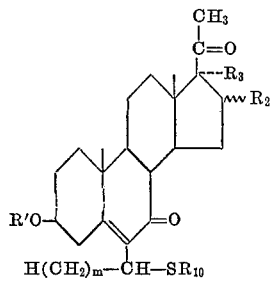

$H(CH_2)_m-CH-SR_{10}$ wherein $m$ is an integer from 0 to 5; $R_{10}$ is lower alkyl, phenyl or phenyl lower alkyl; and R', $R_2$ and $R_3$ are as above; in an inert organic solvent in the presence of Raney-nickel.

39. A process of producing a compound of the formula:

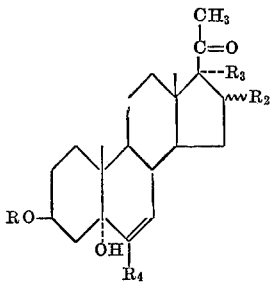

wherein R is hydrogen and lower alkanoyl; $R_2$ is hydrogen, hydroxy, lower alkylidene and lower alkyl; $R_3$ is hydroxy, lower alkanoyloxy or taken together with $R_2$ form a moiety of the formula:

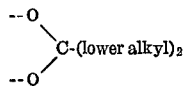

and $R_4$ is lower alkyl; comprising treating a compound of the formula:

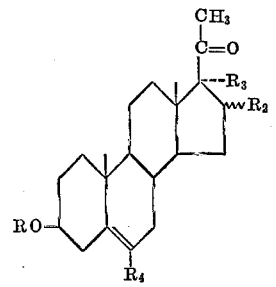

wherein R, $R_2$, $R_3$ and $R_4$ are as above, with chlorine dissolved in a halogenated hydrocarbon solvent in the presence of a proton acceptor.

40. A process for producing a compound of the formula

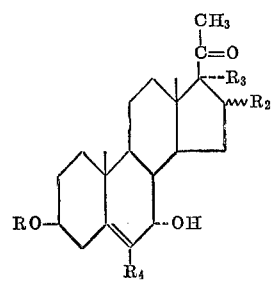

wherein R is hydrogen and lower alkanoyl; $R_2$ is hydrogen, hydroxy and lower alkyl; $R_3$ is hydroxy, lower alkanoyloxy or taken together with $R_2$ form a moiety of the formula:

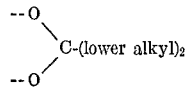

and $R_4$ is lower alkyl; comprising treating a compound of the formula

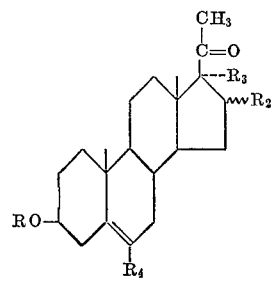

wherein R, $R_2$, $R_3$ and $R_4$ are as above, with chlorine dissolved in a halogenated hydrocarbon solvent in the presence of a proton acceptor.

41. A process for producing a compound of the formula:

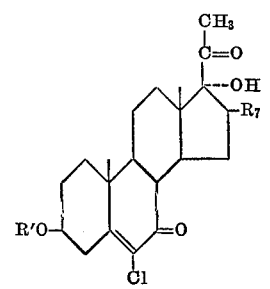

wherein $R_7$ is lower alkylidene and R' is a lower alkanoyl, comprising refluxing in an inert organic solvent a compound of the formula:

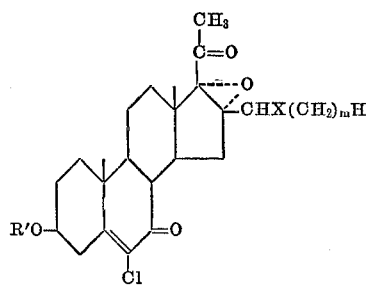

wherein R' is lower alkanoyl; X is halogen; $m$ is an integer from 0 to 5; with an alkali metal iodide in the presence of a lower alkanoic acid or followed by the addition of lower alkanoic acid.

No references cited.

ELBERT L. ROBERTS, Primary Examiner

U.S. Cl. X.R.

260—239.55 D, 397.4; 424—243

PO-1050
(5/69)

UNITED STATES PATENT OFFICE
CERTIFICATE OF CORRECTION

Patent No. 3,635,954          Dated January 18, 1972

Inventor(s) Kierstead and LeMahieu

It is certified that error appears in the above-identified patent and that said Letters Patent are hereby corrected as shown below:

Column 23, line 20   (claim 1)

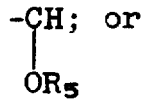   should be   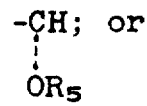

Column 25, line 42 (Claim 26)

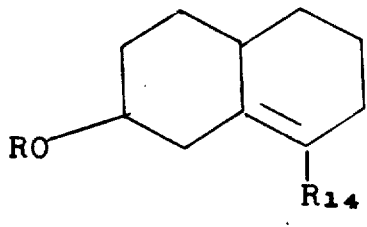   should be   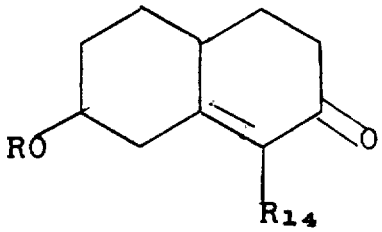

Column 27, line 73 (Claim 36)

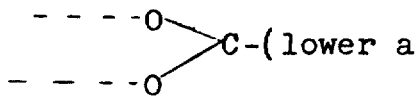   should be   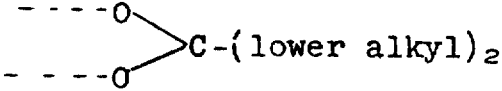

Signed and sealed this 8th day of August 1972.

(SEAL)
Attest:

EDWARD M. FLETCHER, JR.
Attesting Officer

ROBERT GOTTSCHALK
Commissioner of Patents